(12) United States Patent
Tofilescu et al.

(10) Patent No.: US 9,694,764 B2
(45) Date of Patent: Jul. 4, 2017

(54) VEHICLE ELECTROMECHANICAL SYSTEMS TRIGGERING BASED ON IMAGE RECOGNITION AND RADIO FREQUENCY

(71) Applicant: FLEXTRONICS AUTOMOTIVE INC., Newmarket (CA)

(72) Inventors: Pompilian Tofilescu, Newmarket (CA); Reginald C. Grills, Oshawa (CA); Yarko Matkiwsky, Whitby (CA)

(73) Assignee: Flextronics Automotive, Inc., Newmarket, Ontario (CA)

( * ) Notice: Subject to any disclaimer, the term of this patent is extended or adjusted under 35 U.S.C. 154(b) by 31 days.

(21) Appl. No.: 14/650,770

(22) PCT Filed: Dec. 9, 2013

(86) PCT No.: PCT/CA2013/050945
§ 371 (c)(1),
(2) Date: Jun. 9, 2015

(87) PCT Pub. No.: WO2014/089696
PCT Pub. Date: Jun. 19, 2014

(65) Prior Publication Data
US 2015/0336521 A1    Nov. 26, 2015

Related U.S. Application Data

(63) Continuation-in-part of application No. PCT/CA2012/050886, filed on Dec. 10, 2012.
(Continued)

(51) Int. Cl.
*G06K 9/00* (2006.01)
*B60R 16/023* (2006.01)

(52) U.S. Cl.
CPC ........ *B60R 16/023* (2013.01); *G06K 9/00335* (2013.01); *G06K 9/00791* (2013.01)

(58) Field of Classification Search
None
See application file for complete search history.

(56) References Cited

U.S. PATENT DOCUMENTS 7,289,645 B2 * 10/2007 Yamamoto ............. B60K 37/06
382/104
8,433,445 B2 * 4/2013 Busse ................... G01S 17/026
340/5.72
(Continued)

FOREIGN PATENT DOCUMENTS

CN          1499344 A       5/2004
DE    102009030274 A1       1/2010
(Continued)

OTHER PUBLICATIONS

Smith, T., "Ford: kick your car to open the boot, Gesture recognition tech added to new Kuga," The Register [online], Mar. 6, 2012 (Jun. 3, 2012) [retrieved on Jan. 22, 2014 (Jan. 22, 2014). Retrieved from the Internet <URL: http://www.theregister.co.uk/2012/03/06/ford_adds_gesture_recognition_to_kuga_for_handsfree_boot_opening/>.

*Primary Examiner* — Nancy Bitar
(74) *Attorney, Agent, or Firm* — Volpe and Koenig, P.C.

(57) ABSTRACT

Described herein is a system and method of activating vehicle electromechanical systems based on image recognition and radio frequency systems. The system includes radio frequency (RF) antennas for receiving wireless communication signals from a transponder. A RF controller verifies that the transponder is associated with the vehicle. Upon detection and verification of the transponder, a camera system captures images and an image processing engine determines if the images contain valid gestures associated with commands for the electromechanical systems. A controller triggers the electromechanical systems to perform the (Continued)

command if the gesture is valid. For example, the command may be an activation or deactivation command.

19 Claims, 19 Drawing Sheets

Related U.S. Application Data

(60) Provisional application No. 61/812,062, filed on Apr. 15, 2013.

(56) References Cited

U.S. PATENT DOCUMENTS

| | | | | |
|---|---|---|---|---|
| 8,688,325 | B2* | 4/2014 | Wolf | B60R 25/2045 348/154 |
| 9,156,439 | B2* | 10/2015 | Hirota | G07C 9/00309 |
| 2006/0093203 | A1* | 5/2006 | Good | G06T 7/0004 382/141 |
| 2008/0296926 | A1* | 12/2008 | Hanzel | B60R 25/2054 296/146.1 |
| 2009/0030579 | A1* | 1/2009 | Takehisa | E05F 15/76 701/49 |
| 2011/0242303 | A1* | 10/2011 | Giraud | E05B 81/78 348/77 |
| 2011/0248820 | A1* | 10/2011 | Gehin | G07C 9/00309 340/5.72 |
| 2015/0127193 | A1* | 5/2015 | Tofilescu | E05F 15/73 701/2 |

FOREIGN PATENT DOCUMENTS

| | | |
|---|---|---|
| DE | 102009044389 A1 | 5/2011 |
| FR | 2936545 A1 | 4/2010 |
| JP | 2005315024 A | 11/2005 |
| JP | 2007025767 A | 2/2007 |
| WO | WO2012/034784 A1 | 3/2012 |

* cited by examiner

VEHICLE ELECTROMECHANICAL SYSTEMS TRIGGERING BASED ON IMAGE RECOGNITION AND RADIO FREQUENCY

CROSS REFERENCE TO RELATED APPLICATIONS

This application claims the benefit of PCT/CA2013/050945, filed Dec. 9, 2013, and U.S. Provisional Application No. 61/812,062, filed Apr. 15, 2013, and is a continuation-in-part of PCT Patent Application No. PCT/CA2012/050886, filed Dec. 10, 2012, which claims the benefit of U.S. Provisional Application No. 61/568,828, filed Dec. 9, 2011, the contents of which are hereby incorporated by reference herein.

FIELD OF INVENTION

This application is related to vehicle electronics.

BACKGROUND

Vehicles have a number of electromechanical systems including automatic power lift gates, trunk lids or hoods, sunroofs, sliding doors, doors, remote control transponders, keyfobs, airbags, wireless remote starters, voice activated telephones, sound systems, global positioning system, seat positioning, temperature controls, light controls and the like. Users may want to use a touchless activation of the electromechanical systems upon approaching the vehicle or when they are in the vehicle due to security or convenience reasons.

SUMMARY

Described herein is a system and method of activating vehicle electromechanical systems based on image recognition and radio frequency systems. The system includes radio frequency (RF) antennas for receiving wireless communication signals from a transponder. A RF controller verifies that the transponder is associated with the vehicle. Upon detection and verification of the transponder, a camera system captures images and an image processing engine determines if the images contain valid gestures associated with commands for the electromechanical systems. A controller triggers the electromechanical systems to perform the command if the gesture is valid. For example, the command may be an activation or deactivation command.

DETAILED DESCRIPTION

Figure 1:
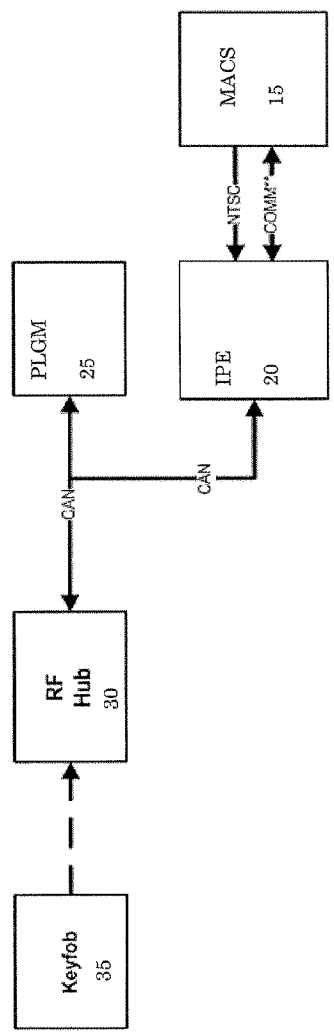
FIG. 1 is an embodiment of an automated portal entry system.

It is to be understood that the figures and descriptions of embodiments of a system and method of activating or triggering predetermined functions for vehicle electromechanical systems based on image recognition and radio frequency systems have been simplified to illustrate elements that are relevant for a clear understanding, while eliminating, for the purpose of clarity, many other elements found in typical vehicle systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein.

The non-limiting embodiments described herein are with respect to system and method of activating or triggering predetermined functions for vehicle electromechanical systems based on image recognition and radio frequency systems. Other electronic devices, modules and applications may also be used in view of these teachings without deviating from the spirit or scope as described herein. The system and method of activating or triggering predetermined functions for vehicle electromechanical systems based on image recognition and radio frequency systems may be modified for a variety of applications and uses while remaining within the spirit and scope of the claims. The embodiments and variations described herein, and/or shown in the drawings, are presented by way of example only and are not limiting as to the scope and spirit. The descriptions herein may be applicable to all embodiments of the system and method of activating or triggering predetermined functions for vehicle electromechanical systems based on image recognition and radio frequency systems although it may be described with respect to a particular embodiment.

FIG. 1 is an embodiment of an automated portal entry system 10. The automated portal entry system 10 includes a MACS module 15 in communication with an image processing engine (IPE) 20 over a communications bus (COMM), which may be a local interconnect network (LIN) bus or a hardwired input. The IPE 20 is in communication with a power lift gate module (PLGM) 25 and a radio frequency (RF) hub 30 over a controller area network (CAN) bus.

Operationally, the RF hub 30 will detect and identify a key fob 35 or some other like device and send an enable or wake-up signal to the IPE 20, which in turn will send the enable or wake-up signal to the MACS module 15. The MACS module 15 will send image or video information to the IPE 20. The information may be an analog or digital signal. For example, the analog signal may be a National Television System Committee (NTSC) composite video signal. The IPE 20 uses an image processing algorithm to determine if a person is standing at the back of the car. For example, the algorithm may be based on light, contour, or color gradient changes. The algorithm is robust enough to differentiate between a person standing next to the vehicle or a passerby. If the IPE 20 determines that a person is standing at the back of the vehicle, the IPE 20 sends an open signal to the PLGM 25 to open the lift gate.

Figure 2:
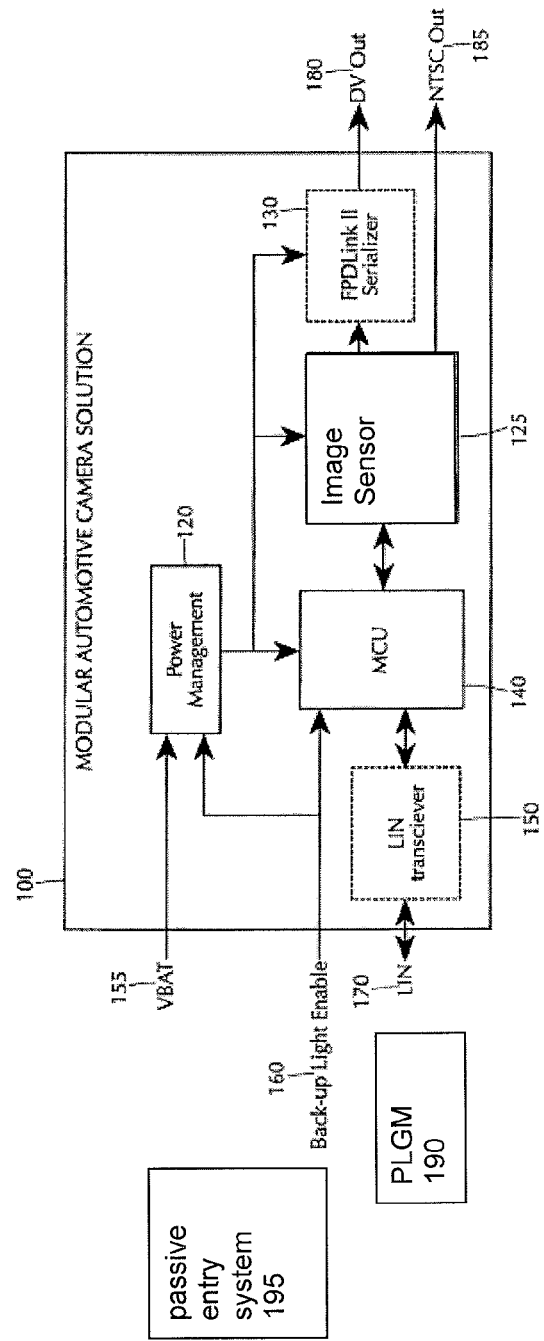
FIG. 2 is an embodiment of a modular automotive camera solution (MACS module)

FIG. 2 is an embodiment of a MACS module 100. The MACS module 100 includes a power management module 120 that is connected to a microcontroller 140, an image sensor 125, and if available, a serializer 130. The microcontroller (MCU) 140 may be further connected to a local interconnect network (LIN) transceiver 150 and to the image sensor 125, which in turn may be connected to the serializer 130.

The MACS module 100 receives as inputs a battery voltage 155 and enable signal 160 from a passive entry system 195. The power management module 120 converts the battery voltage 155 and supplies the required voltages to the MCU 140, the image sensor 125, and if available, the serializer 130. The image sensor 125 is a complementary metal-oxide-semiconductor (CMOS) sensor based camera. The enable signal 160 is sent to the power management module 120 and the MCU 140 when identification is authenticated or verified, (for example, a key fob is detected). The MACS module 100 can be configured to output an analog National Television System Committee (NTSC) composite video signal 185 from the image sensor 125 and/or a digital video 180 through a low voltage differential signaling (LVDS) output in the serializer 130. The LIN transceiver 150 is configured to communicate via a LIN bus 170 with other vehicle electronic components or modules in the vehicle such as, for example, a passive entry system/module and a power lift gate module (PLGM) 190.

In general, the MACS module 100 is configured to recognize the presence of a user and to control the opening of, for example, a lift gate. The MACS module 100 is installed as a rear view camera module in the vehicle and works in conjunction with a passive entry system and PLGM. The MACS module 100 functions as a sensor as part of a lift gate drive system/motor control mechanism. The MACS module can also be used in a minimal configuration as an automotive rear view camera or can be used in conjunction with a master module for image processing in driver assist applications like bird eye view, blind spot detection, and the like.

Figure 3:
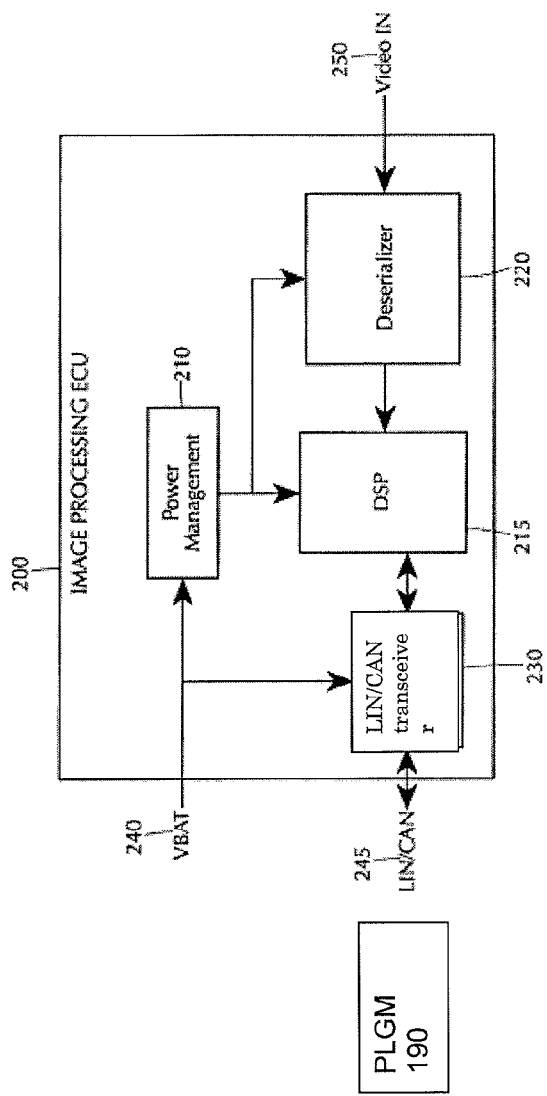
FIG. 3 is an embodiment of an image processing engine (IPE) module.

FIG. 3 is an embodiment of an image processing engine (IPE) module 200 that includes a power management module 210 connected to a digital signal processor (DSP) 215 and if applicable or available, a deserializer 220. The DSP 215 may be further connected to a local interconnect network (LIN)/controller area network (CAN) transceiver 230 and to the deserializer 220. The LIN transceiver 230 is configured to communicate via a LIN/CAN bus 245 with other vehicle electronic components or modules in the vehicle such as, for example, a passive entry system/module and a PLGM 190.

The IPE 200 receives as input a battery voltage 240 and a video information signal 250. The power management module 210 converts the battery voltage 240 and supplies the required voltages to the DSP 215 and if available, the deserializer 220. The video signal 250 is received by the deserializer 220, which in turn sends the video information signal 250 to the DSP 215 for analysis.

The IPE 200 performs image processing and communicates with both the PLGM 190 and the MACS module 100. The IPE 200 receives the video information signal 250 and based on an image processing algorithm in the DSP 215 decides if a person is standing at the back of the car. The algorithm can be based on light, contour or color gradient changes. The algorithm differentiates between a person standing and a passerby. In case of a positive determination, the IPE 200 communicates to the PLGM 190 via the LIN transceiver 230 over the LIN/CAN bus 245 to open the lift gate.

Operationally, a person will need to carry the proper identification, i.e. a key fob or other similar identification and be in the field of view of the rearview camera of the MACS module 100. The passive entry system 195 detects and/or authenticates the key fob, and sends an enable signal 160 to the PLGM 190, IPE 200 and the MACS module 100. The IPE 200 reads the image captured by the rearview camera/image sensor 125 of the MACS module 100 and determines if the lift gate should be opened. In an embodiment, the person may need to gesture in a predetermined manner, for example, waving a knee in front of the rearview camera, (which may be located above the license plate, inside the license plate lights bar), to ensure or increase the reliability or robustness of the detection algorithm. The decision is communicated to the PLGM 190 that controls the lift gate.

Figure 4A:
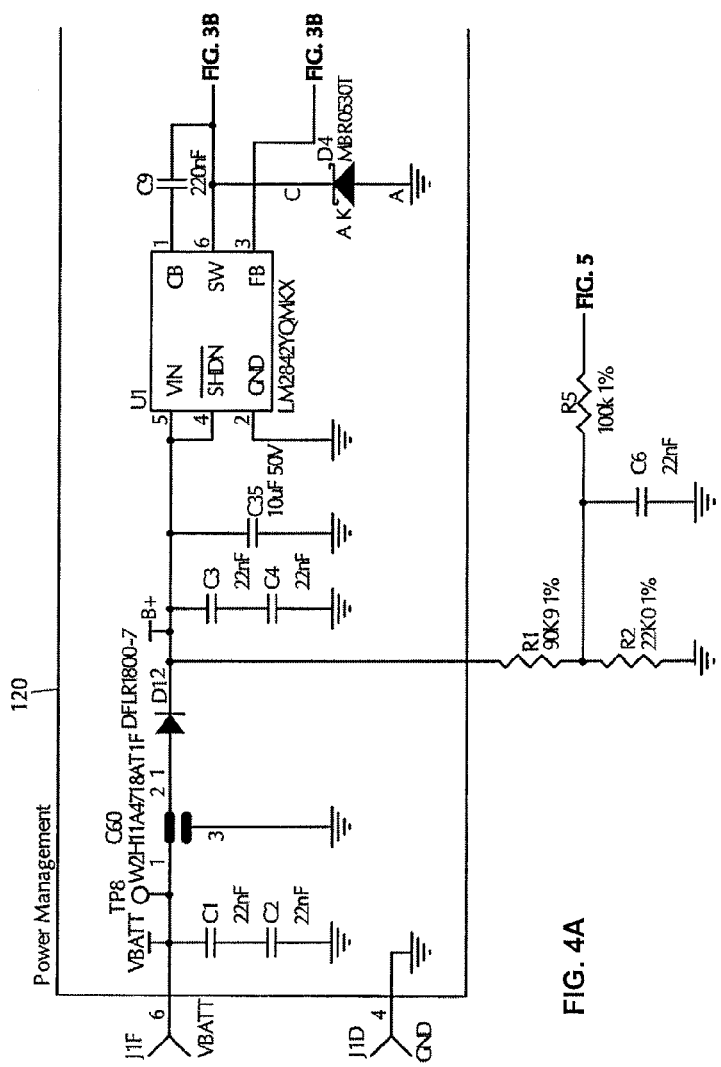
FIGS. 4A and 4B are embodiments of a power management circuit with connections to other circuits for the MACS and IPE modules.
Figure 4B:
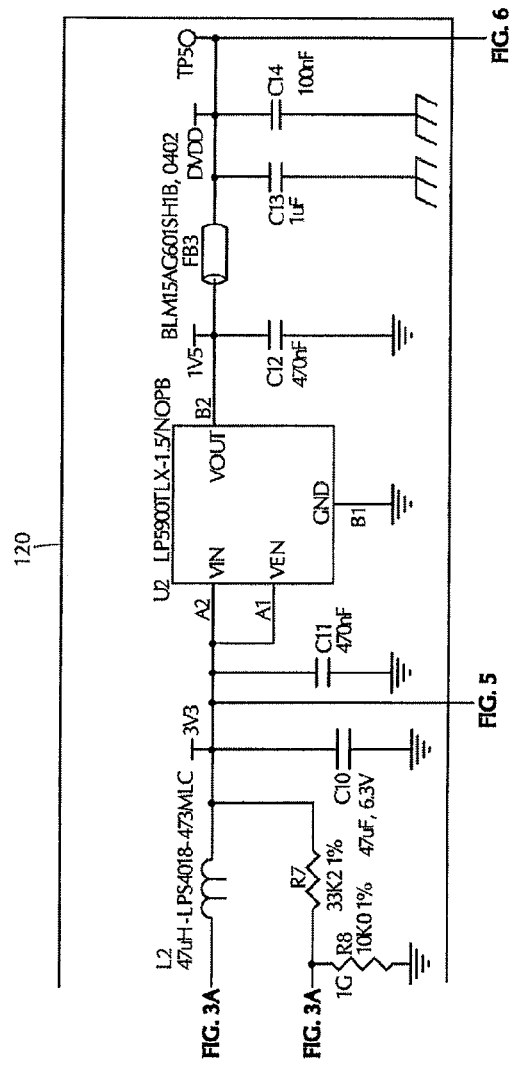

FIGS. 4A-9 show an embodiment of the MACS module 100. The power management module 120 may include an example switch mode power supply circuit 300 and an example linear low dropout regulator circuit 305, embodiments for which are shown in FIGS. 4A and 4B. The switch mode power supply circuit 300 is configured to convert the battery voltage into the 3.3V required to supply the microcontroller 140, the serializer 130, and the analog and internal circuitries of the image sensor 125. The linear low dropout regulator 305 is configured to convert the 3.3V to the 1.5V required to supply the digital core of the image sensor 125.

Figure 5:
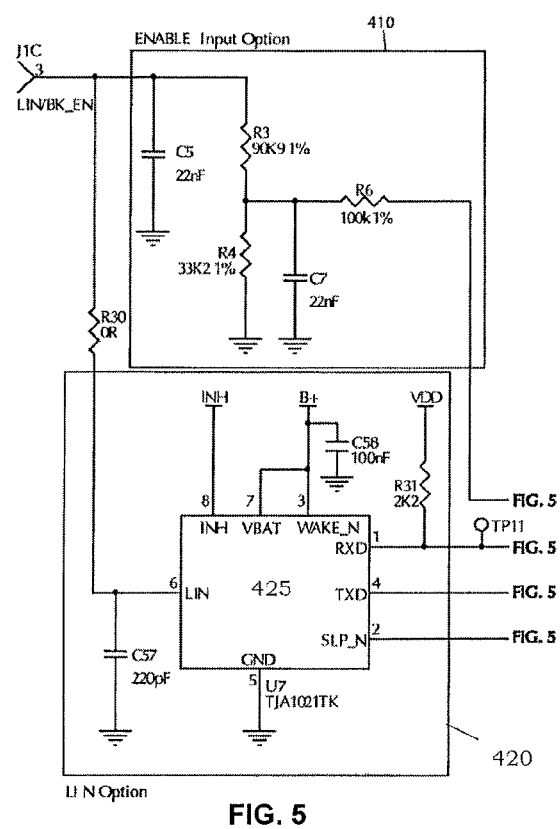
FIG. 5 is an embodiment of an enable circuit and a local interconnect network circuit with connections to other circuits for the MACS and IPE modules.

FIG. 5 shows an embodiment of an enable circuit 410 and a LIN circuit 420. The enable circuit 410 is a digital input interface which allows the camera module to be awakened on an external hard wired input. In the case of the rear view camera application, this input can be the backup lights signal. The LIN circuit 420 includes a LIN transceiver integrated circuit (IC) 425 which interfaces the LIN bus 170 with the MCU 140. The LIN circuit 420 may also be used to wake up the MACS module 100 on a bus request and may be used for MCU 140 re-flashing. It may also be used for remote and/or real time update of the registers in the image sensor 125. For example, on a birds view application when four cameras are used, the image sensor parameters of each camera need to be controlled as a function of specific light conditions. This is also applicable for lift gate control applications if the IPE 200 needs to control and/or adjust the MACS module 100/camera parameters.

Figure 6:
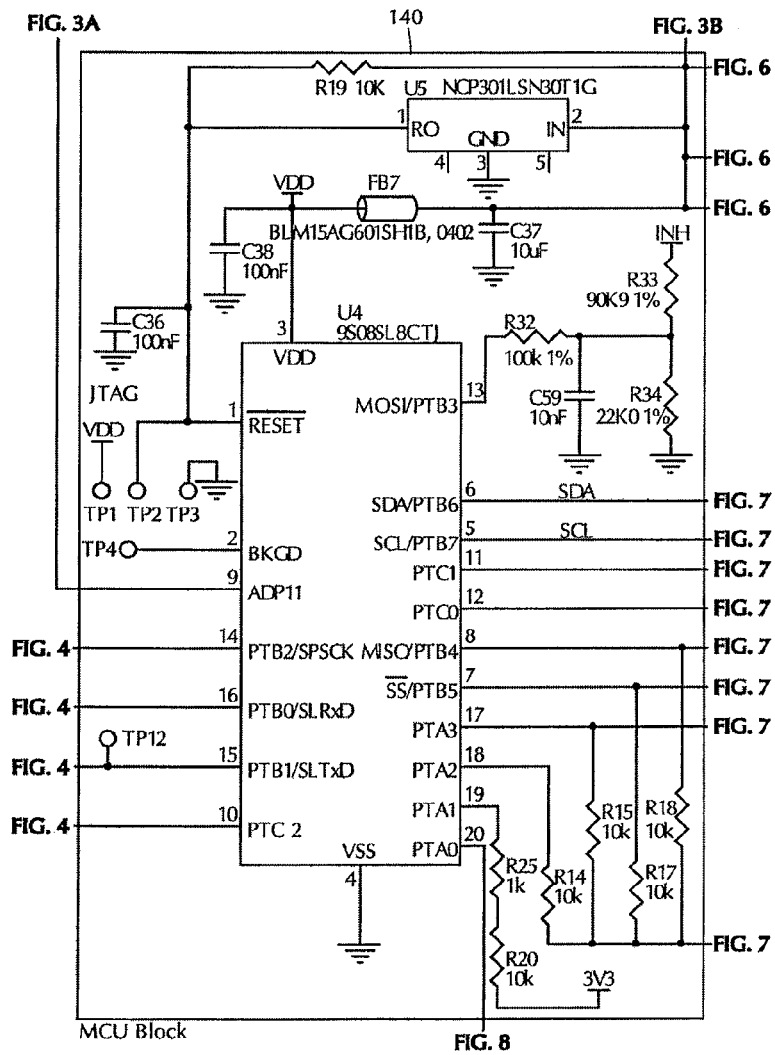
FIG. 6 is an embodiment of a microcontroller circuit with connections to other circuits for the MACS and IPE modules.
Figure 7:
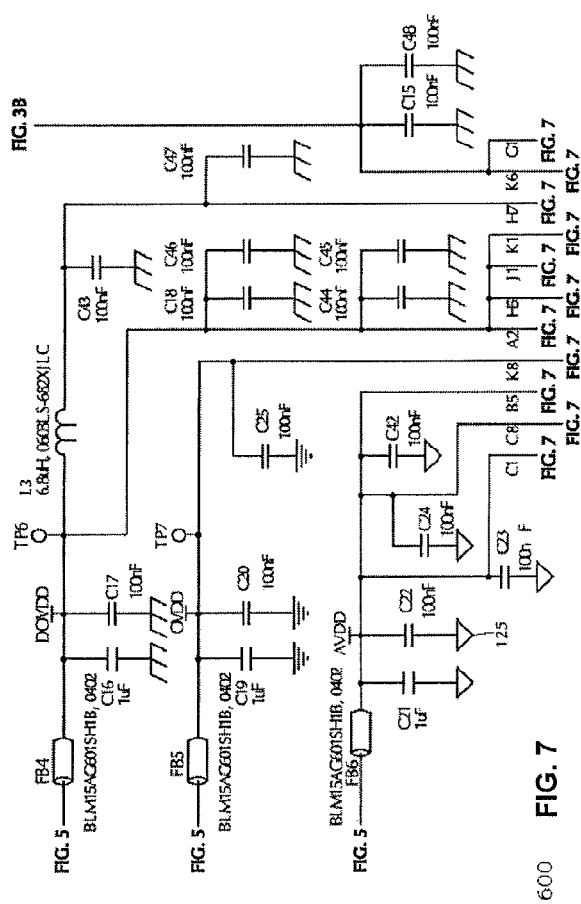
FIG. 7 is an embodiment of circuitry interconnecting the microcontroller circuit of FIG. 6 and an image sensor of FIG. 8.
Figure 8:
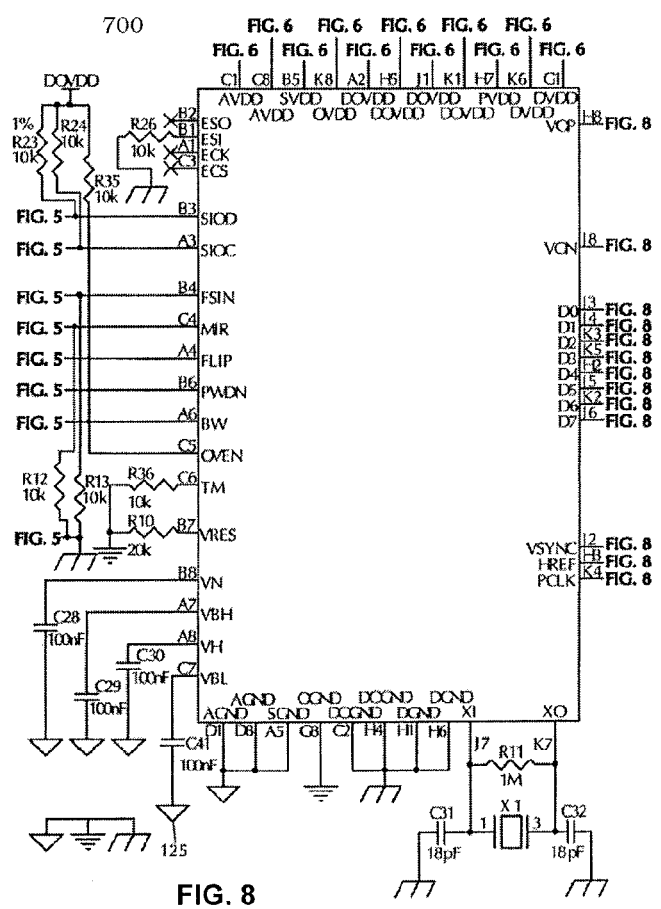
FIG. 8 is an embodiment of an image sensor with connections to other circuits for the MACS and IPE modules.
Figure 9:
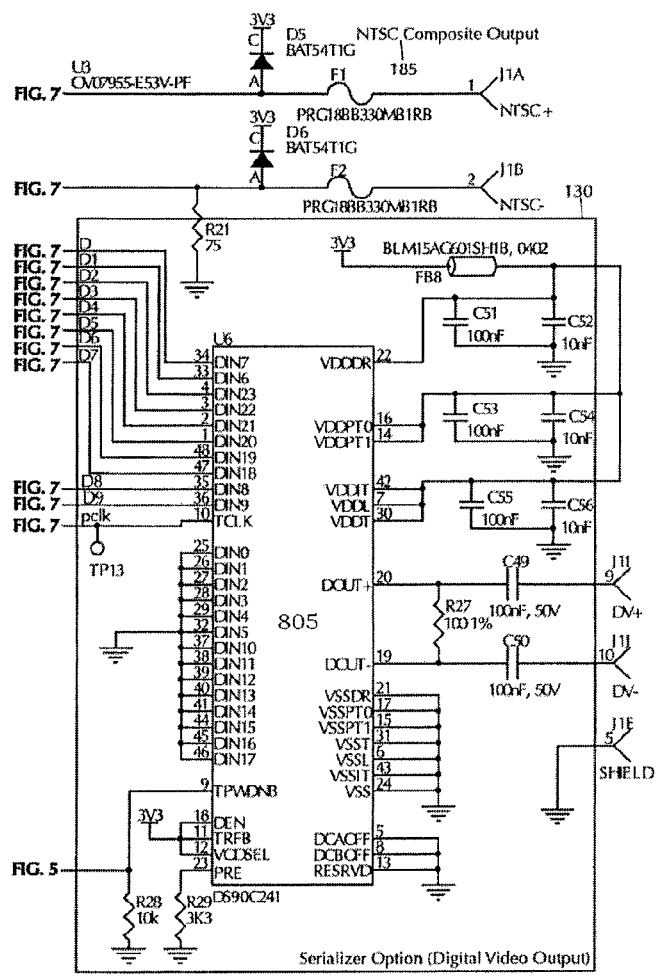
FIG. 9 is an embodiment of a serializer with connections to other circuits for the MACS and IPE modules.

FIG. 6 shows an embodiment of a microcontroller circuit 140 and FIG. 7 shows an embodiment of circuits 600 interconnecting the microcontroller circuit 140 of FIG. 6 and an image sensor 700 of FIG. 8. The microcontroller circuit 140 updates the registers on an image sensor 700 through the I²C bus after a power on reset. It monitors the vehicle battery voltage through the R1, R2 resistive voltage divider network shown in FIG. 4A. It also controls the power up/down of the image sensor 700 via the circuits 600 and a serializer IC 805 of a serializer circuit 130 as shown in FIG. 9, (i.e. output pins 8 and 20). The microcontroller circuit 140 communicates with the other modules in the vehicle via the LIN circuit 420 shown in FIG. 5.

FIG. 8 shows an embodiment of the image sensor 700, which may be for example, an Omnivision® OV07955, an automotive video graphics array (VGA) sensor. The image sensor 700 outputs both an analog video signal, (i.e. NTSC) and an 8 bit digital video signal. For example, the analog video signal is NTSC signal 185 in FIG. 9.

FIG. 9 shows an embodiment of the serializer circuit 130 that includes the serializer IC 805. The serializer IC 805 processes a parallel digital video output together with a vertical synchronization signal (VSYNC), a horizontal synchronization signal (HSYNC) and pixel clock information and outputs a two wire differential serial signal. This signal is sent to the IPE 200 and used to detect the presence of the driver at the back of the vehicle.

Figure 10:
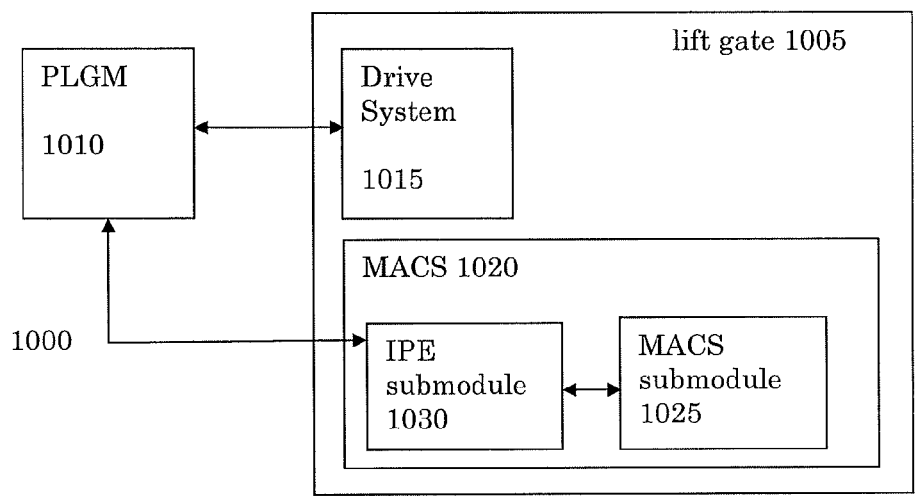
FIG. 10 is an embodiment of an automated portal entry system with a MACS module integrated with an IPE module.

FIG. 10 is an embodiment of an automated portal entry system 1000 with a MACS module integrated with an IPE module. The automated portal entry system 1000 is in part located at a lift gate 1005 and includes a drive system 1015, a MACS module 1020 and PLGM 1010 which are interconnected as described herein above. The MACS module 1020 includes an IPE submodule 1030 and a MACS submodule 1025. The automated portal entry system 1000 functions or operates as described herein above for any of the embodiments.

Figure 11:
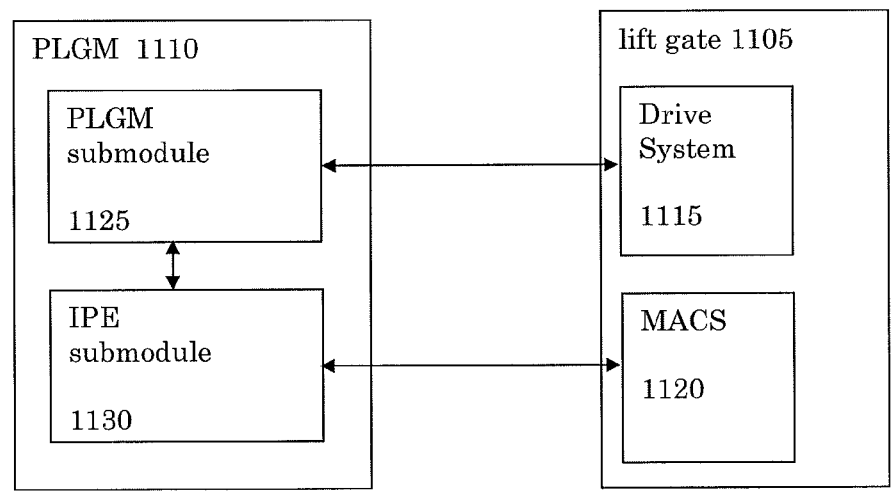
FIG. 11 is an embodiment of an automated portal entry system with a power lift gate module (PLGM) integrated with an IPE module.

FIG. 11 is an embodiment of an automated portal entry system 1100 with a power lift gate module (PLGM) integrated with an IPE module. The automated portal entry system 1100 is in part located at a lift gate 1105 and includes a PLGM 1110, a drive system 1115, and a MACS module 1120, which are interconnected as described herein above. The PLGM module 1110 includes a PLGM submodule 1125 and an IPE submodule 1130. The automated portal entry system 1100 functions or operates as described herein above for any of the embodiments. In another embodiment, the IPE may be part of a rear zone module electronics package.

Figure 12:
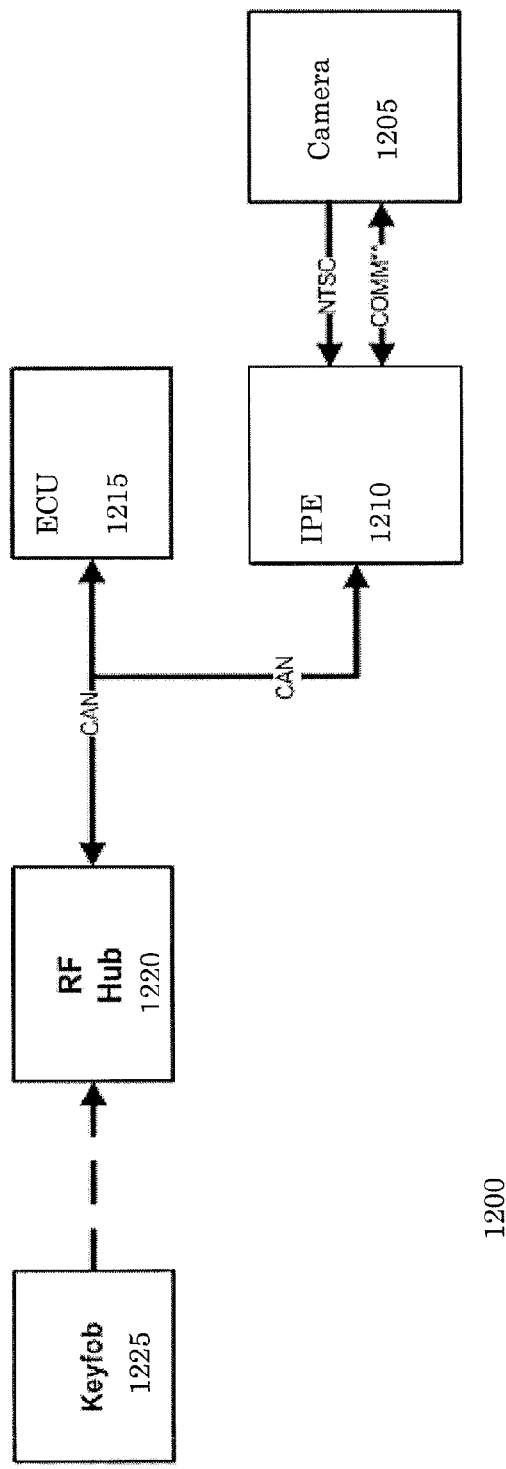
FIG. 12 is an embodiment of a system for activating vehicle electromechanical systems based on image recognition and radio frequency systems.

FIG. 12 is an embodiment of a system 1200 for activating or triggering predetermined functions for vehicle electromechanical systems based on image recognition and radio frequency (RF) systems. The system 1200 includes an automotive camera module 1205 in communication with an image processing engine (IPE) 1210 over a communications bus (COMM), which may be a LIN bus, a CAN bus, a hardwired input or any other automobile communication system or network. The automotive camera module 1205 may be any automotive camera that is capable of capturing images and in some embodiments may include an image analysis engine. As described herein below, the automotive camera module 1205 may include multiple camera modules. The IPE 1210 is in communication with an electronics control unit (ECU) 1215 and a radio frequency (RF) hub 1220 over a CAN bus a hardwired input or any other automobile communication system or network. The ECU 1215 is the controller for the electromechanical systems that may be activated using the image recognition and radio frequency systems. The ECU 1215 may be one controller or multiple controllers, where the multiple controllers can communicate with each other using an automobile communication system, network or bus. Although described as being electromechanical, for the purposes of this description, the electromechanical systems may alternatively be electrical, wireless, optical, electro-optical, optoelectromechanical, (e.g., fiber optic to electromechanical) and the like. The electromechanical systems may be any system of a vehicle that the ECU 1215 is configured to control in response to a user gesture. For example, but not limited to, the electromechanical systems may include automatic power lift gates, trunk lids or hoods, sunroofs, sliding doors, doors, remote control transponders, keyfobs, airbags, wireless remote starters, voice activated telephones, sound systems, global positioning system, seat positioning, temperature controls, light controls and the like.

In general, the RF hub 1220 will detect and identify a key fob 1225 or some other like device and send an enable or wake-up signal to the IPE 1210, which in turn will send the enable or wake-up signal to the automotive camera module 1205. The automotive camera module 1205 will send image or video information to the IPE 1210. The information may be an analog or digital signal. For example, the analog signal may be a National Television System Committee (NTSC) composite video signal. The IPE 1210 uses an image processing algorithm to determine if a person is gesturing with respect to a particular electromechanical system. If the IPE 1210 determines that the person is gesturing to perform a predetermined function with respect to a particular electromechanical system, the IPE 1210 sends a signal to the ECU 1215 to trigger the predetermined function at the electromechanical system.

Figure 13:
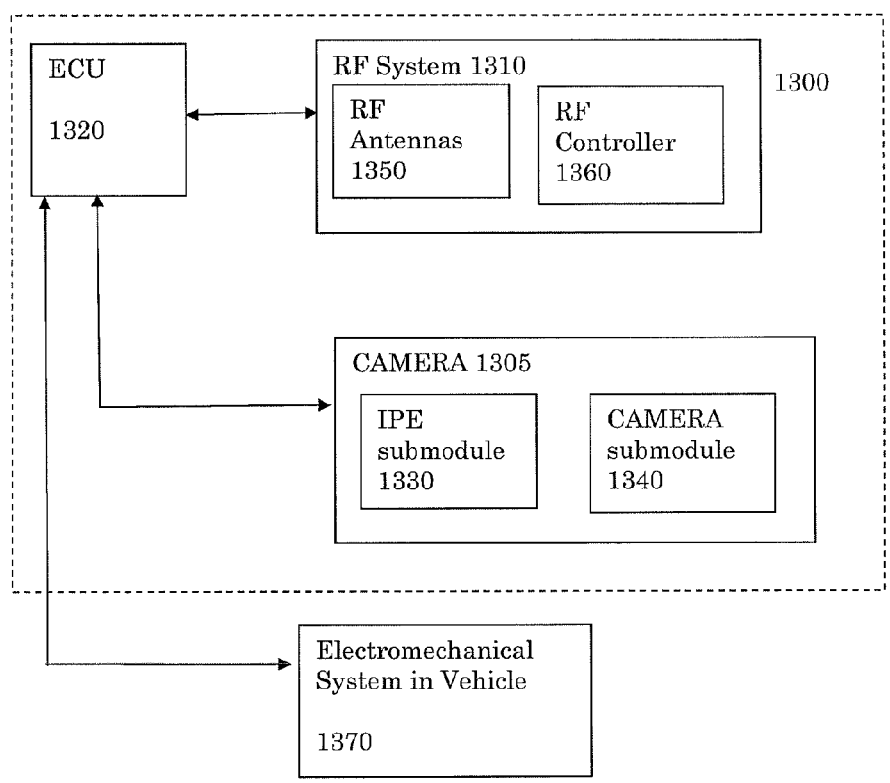
FIG. 13 is another embodiment of a system for activating vehicle electromechanical systems based on image recognition and radio frequency systems.

FIG. 13 is an embodiment of a system 1300 that activates or triggers predetermined functions for electromechanical systems based on RF systems and image/gesture recognition. System 1300 includes a camera module 1305, a RF system 1310 and an ECU 1320 which are interconnected as described herein. The camera module 1305 includes an IPE submodule 1330 and a camera submodule 1340. The camera module 1305 may be located in strategic locations on the vehicle as described herein below. The RF system 1310 includes RF antennas 1350 and a RF controller 1360. In some embodiments, the RF controller 1360 may be part of the ECU 1320. As described herein in detail below, in response to receiving a signal from the RF system 1310 that a person/user is approaching a vehicle, the ECU 1320 alerts the camera 1305 to capture and analyze any gestures made by the person. The ECU 1320 will trigger the electromechanical system 1370 if the camera 1305 has determined that the person has made a gesture to perform a predetermined function with respect to an electromechanical system 1370.

Figure 14:
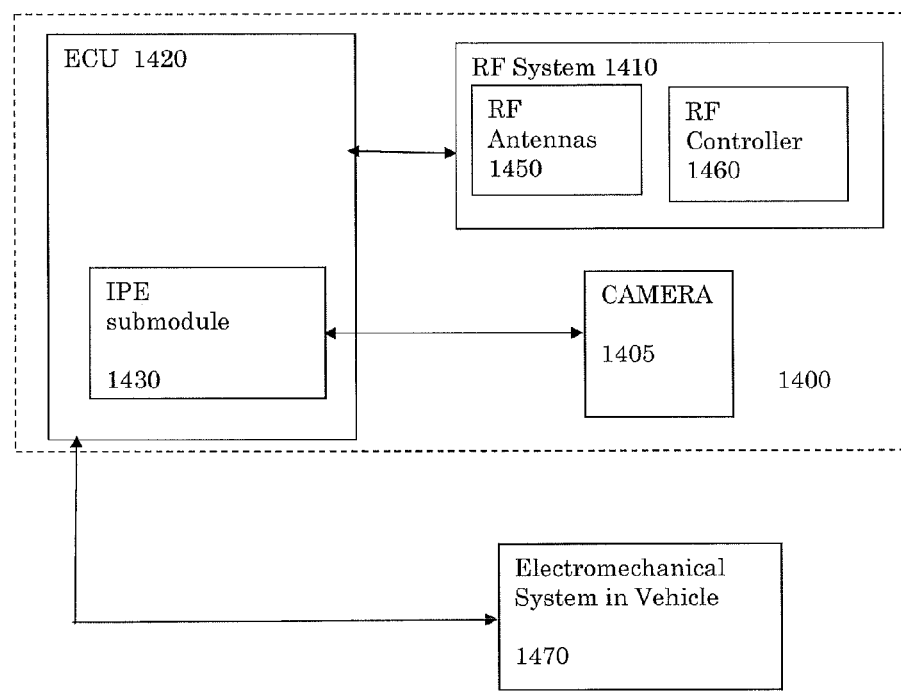
FIG. 14 is another embodiment of a system for activating vehicle electromechanical systems based on image recognition and radio frequency systems.

FIG. 14 is another embodiment of a system 1400 that activates or triggers predetermined functions for electromechanical systems based on RF systems and image/gesture recognition. System 1400 includes a camera module 1405, a RF system 1410 and an ECU 1420 which are interconnected as described herein. The ECU 1420 includes an IPE submodule 1430. The RF system 1410 includes RF antennas 1450 and a RF controller 1460. In some embodiments, the RF controller 1460 may be part of the ECU 1420. As described herein in detail below, in response to receiving a signal from the RF system 1410 that a person/user is approaching a vehicle, the ECU 1420 alerts the camera 1305 to capture any gestures made by the person. The IPE submodule 1430 then determines if a gesture has been made to perform a predetermined function with respect to an electromechanical system 1470. The ECU 1420 will trigger the electromechanical system 1470 if the IPE submodule 1430 has determined that the person has made a gesture to perform the predetermined function with respect to the electromechanical system 1470.

Figure 15:
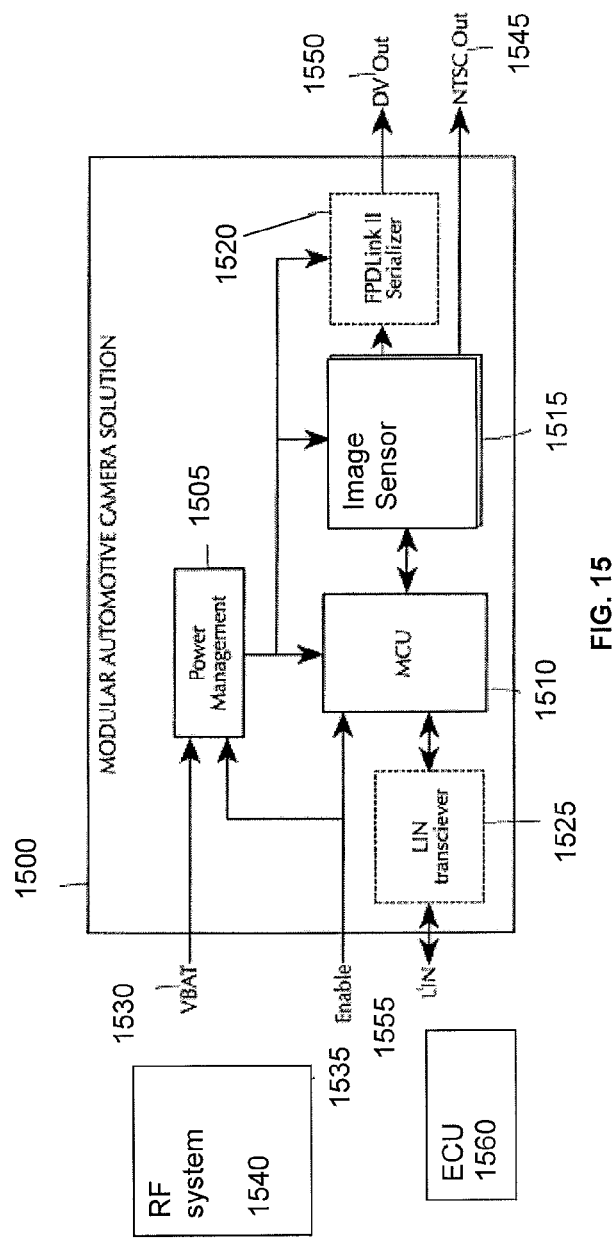
FIG. 15 is an embodiment of an automotive camera module.

FIG. 15 is an embodiment of a camera module 1500 for a system of activating or triggering predetermined functions for vehicle electromechanical systems based on image recognition and radio frequency systems. In this embodiment, for illustrative purposes only, the camera module 1500 is a MACS module. In other embodiments, the camera module 1500 may any automotive camera module that can capture images.

In this embodiment, for illustrative purposes only, the camera module 1500 includes a power management module 1505 that is connected to a microcontroller (MCU) 1510, an image sensor 1515, and if available, a serializer 1520. The 1510 may be further connected to a local interconnect network (LIN) transceiver 1525 and to the image sensor 1515, which in turn may be connected to the serializer 1520. The camera module 1500 may use any automobile communication system, network or bus to communicate with the other automobile systems.

In this embodiment, for illustrative purposes only, the camera module 1500 receives as inputs a battery voltage 1530 and enable signal 1535 from a RF system 1540. Alternatively, the enable signal 1535 may be sent via the ECU 1560. The power management module 1505 converts the battery voltage 1530 and supplies the required voltages to the MCU 1510, the image sensor 1515, and if available, the serializer 1520. The image sensor 1515 is a complementary metal-oxide-semiconductor (CMOS) sensor. The enable signal 1535 is sent to the power management module 1505 and the MCU 1510 when identification is authenticated or verified, (for example, a key fob is detected using the RF system 1540). The camera module 1500 can be configured to output an analog National Television System Committee (NTSC) composite video signal 1545 from the image sensor 1515 and/or a digital video 1550 through a low voltage differential signaling (LVDS) output in the serializer 1520. The LIN transceiver 1525 is configured to communicate via a LIN bus 1555 with an ECU 1560. The camera module 1500 may receive power from any available source, use any type of image sensor, and receive and output any type or form of data.

In general, the camera module 1500 is configured to capture and recognize, (if configured to do so as described herein), user gestures to enable or control the activation of electromechanical systems or perform predetermined functions with respect to the electromechanical systems. The camera module 1500, as described herein below, is installed in multiple locations in and on the vehicle and works in conjunction with the RF system 1540, ECU 1560 and IPE, (described herein below). For example, the camera modules 1500 may be in side mirrors, liftgates, rear view mirrors and other like locations.

Figure 16:
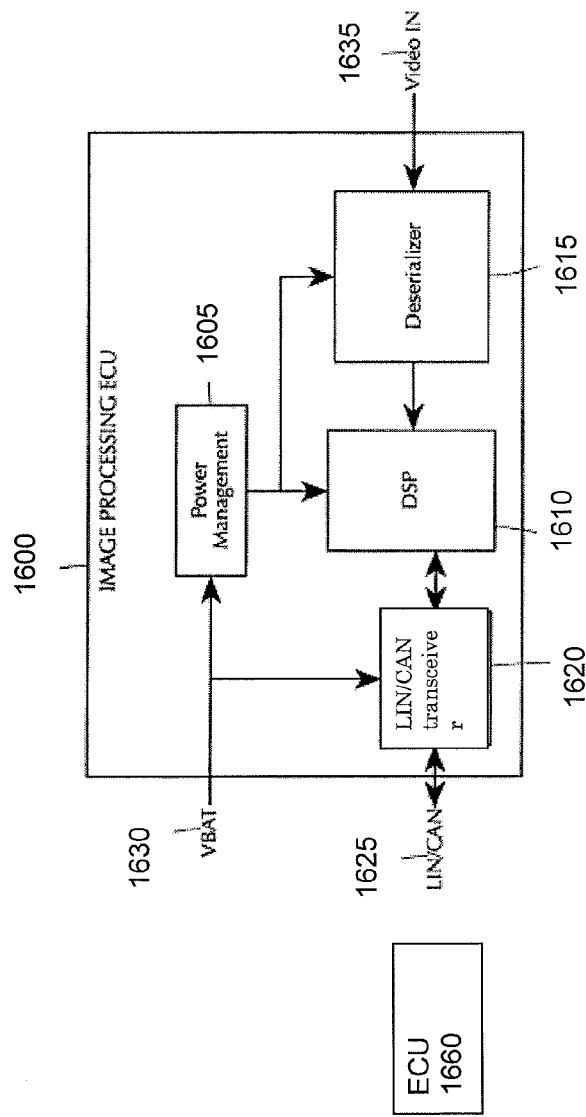
FIG. 16 is an embodiment of an image processing engine (IPE) module.

FIG. 16 is an embodiment of an image processing engine (IPE) module 1600 that includes a power management module 1605 connected to a digital signal processor (DSP) 1610 and if applicable or available, a deserializer 1615. The DSP 1610 may be further connected to a LIN/CAN transceiver 1620 and to the deserializer 1615. The LIN transceiver 1620 is configured to communicate via a LIN/CAN bus 1625 with an ECU 1660. In this embodiment, for illustrative purposes only, the IPE 1600 receives as input a battery voltage 1630 and a video information signal 1635. The power management module 1605 converts the battery voltage 1630 and supplies the required voltages to the DSP 1610 and if available, the deserializer 1615. The video information signal 1635 is received by the deserializer 1615, which in turn sends the video information signal 1635 to the DSP 1610 for analysis. The IPE 1600 performs image processing and communicates with both the ECU 1360 and the camera module, (as shown in FIGS. 12-14). The IPE 1600 receives the video information signal 1635 and based on an image processing algorithm in the DSP 1610 decides if a person is making a gesture. In case of a positive determination, the IPE 1600 communicates to the ECU 1660 via the LIN transceiver 1620 over the LIN/CAN bus 1625 to activate the electromechanical system. This embodiment is for illustration purposes only and the IPE module 1600 may receive power from any available source, use any type of processor, and receive and output any type or form of data.

In general, a RF system detects and/or authenticates a key fob or other transponder that a person is carrying and sends an enable or awake signal to a camera module to capture an image or gesture. Alternatively, the enable or awake signal is sent via ECU 1660. The enable or awake signal can also received from a person detection system preexistent in the vehicle. The IPE 1600 reads the image captured by the camera/image sensor of the camera module and determines if an electromechanical system needs to be activated. In an embodiment, the person may need to gesture in a predetermined manner or using a predetermined signal corresponding to predetermined functions associated with an electromechanical system. For example, one gesture may unlock a door and another gesture may lock the door. The decision is communicated to the ECU 1660, which triggers the electromechanical system.

Figure 17:
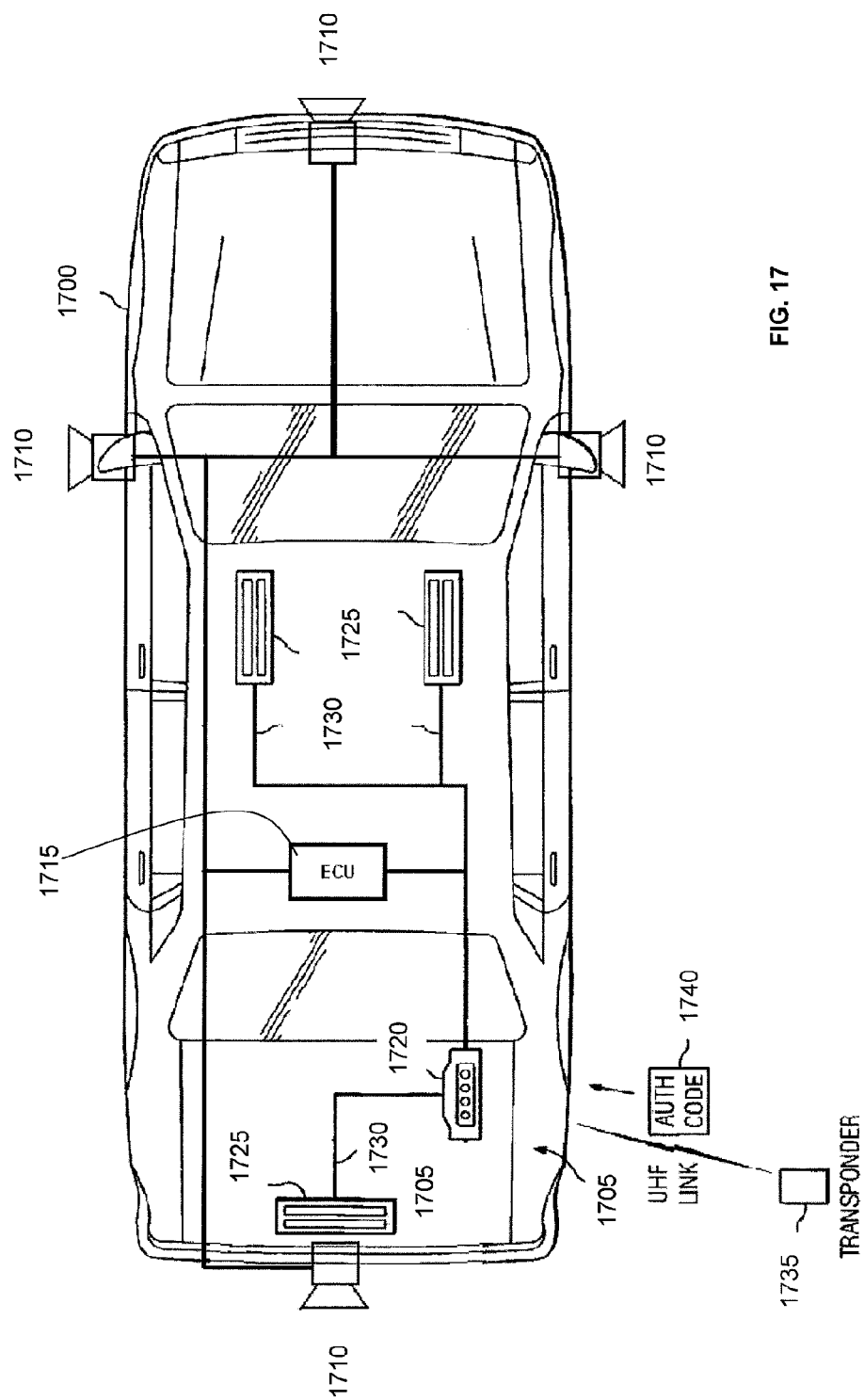
FIG. 17 is another embodiment of a system for activating vehicle electromechanical systems based on image recognition and radio frequency systems.

FIG. 17 is an embodiment of a vehicle 1700 that enables a person to activate or trigger predetermined functions associated with electromechanical systems using gestures. The vehicle 1700 includes any structure or component including roof, sidewalls, doors, windows, bumpers, seats, mirrors, and the like. The vehicle 1700 includes a RF system 1705, and one or more camera modules 1710 as described herein above, all of which are connected to one of more ECUs 1715. The camera modules 1710 are located throughout the vehicle 1700 including at the rear, front, side mirrors, rear view mirror and other like locations.

The RF system 1705 may include an RF controller 1720 that is configured to transmit and receive RF frequency signals. The RF controller 1720 may be configured as a single unit or multiple units. The RF controller 1720 may be in communication with one or more RF antennas 1725. In an embodiment, communication paths 1730 between the RF antennas 1725 and RF controller 1720 may be hardwired or wireless. The RF antennas 1725 may be coupled to the vehicle 1700 in any manner. The number of antennas 1725 may vary depending on the size, model, type, or any other difference between vehicles. The vehicle 1700 may be any motor, rail, aircraft, watercraft or the like vehicle that is consumer, commercial, military or the like. A transponder/keyfob 1735 may be used to communicate with the RF controller 1720 via the RF antennas 1725. The transponder or keyfob 1735 may be a passive transponder or keyfob, (e.g., radio frequency identification (RFID) tag), an active transponder or keyfob or a semi-passive transponder or keyfob.

Described herein are methods for activating or triggering predetermined functions for vehicle electromechanical systems based on image recognition and radio frequency systems for use with the embodiments described herein.

Figure 18:
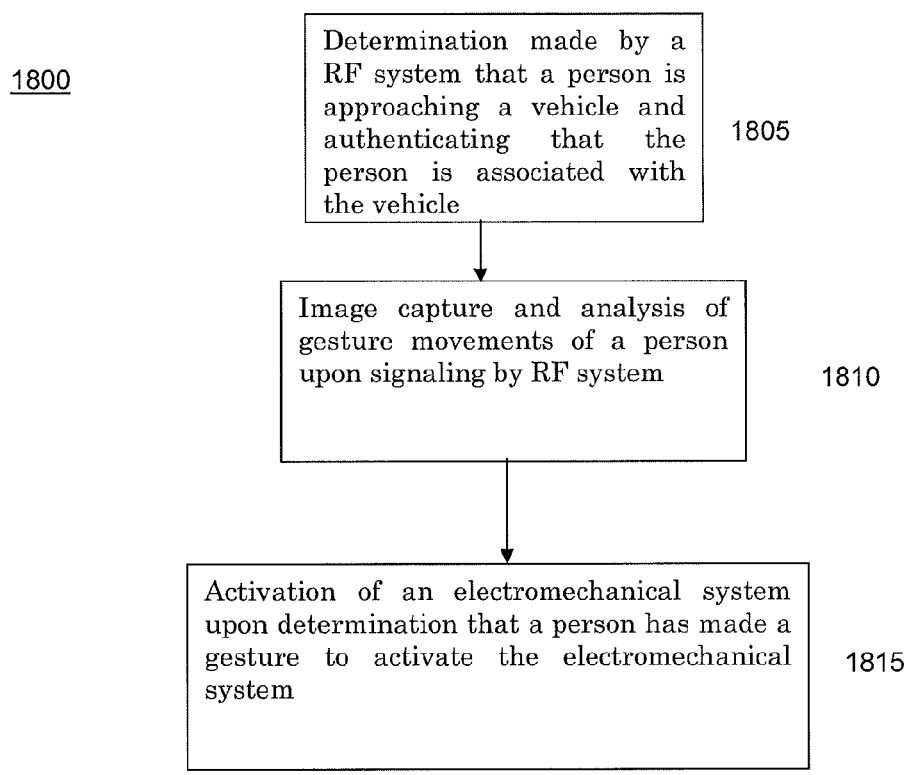
FIG. 18 is an example method for activating vehicle electromechanical systems based on image recognition and radio frequency systems.

FIG. 18 is a flow diagram 1800 of an example method of activating or triggering predetermined functions for vehicle electromechanical systems based on image recognition and radio frequency systems. A determination is made by a RF system that a person is approaching a vehicle and authenticating that the person is associated with the vehicle (1805). This may occur when the RF system detects a RF signal from a transponder or keyfob collocated with the person. To avoid undesired or unauthorized activation, the transponder or keyfob may generate and communicate one or more authorization code(s) that the RF system recognizes as being associated with the respective vehicle. As described herein, the transponder may be part of a passive, active or semi-active RF system. In another embodiment, the vehicle may have a keypad for receiving a code or password or a sensor to identify a person such that the person being locally external to the vehicle may be determined. To minimize power, the RF system may be maintained in a "sleep mode" and may "wake up" and actively determine whether a transponder or keyfob is local to the vehicle through use of one or more RF antenna.

Upon detection of the RF signal, an image capture and analysis system is signaled to capture and analyze gesture movements of the person (1810). The gestures may be a predetermined sequence or pattern of gestures associated with specific electromechanical systems or specific predetermined functions of specific electromechanical systems. The predetermined sequence or pattern of gestures may be customized to the person. An activation signal or trigger is sent by a control system to an electromechanical system if the image capture and analysis system has determined that a person has made a gesture to activate the electromechanical system or perform a predetermined function associated with the electromechanical system (1815).

Figure 19:
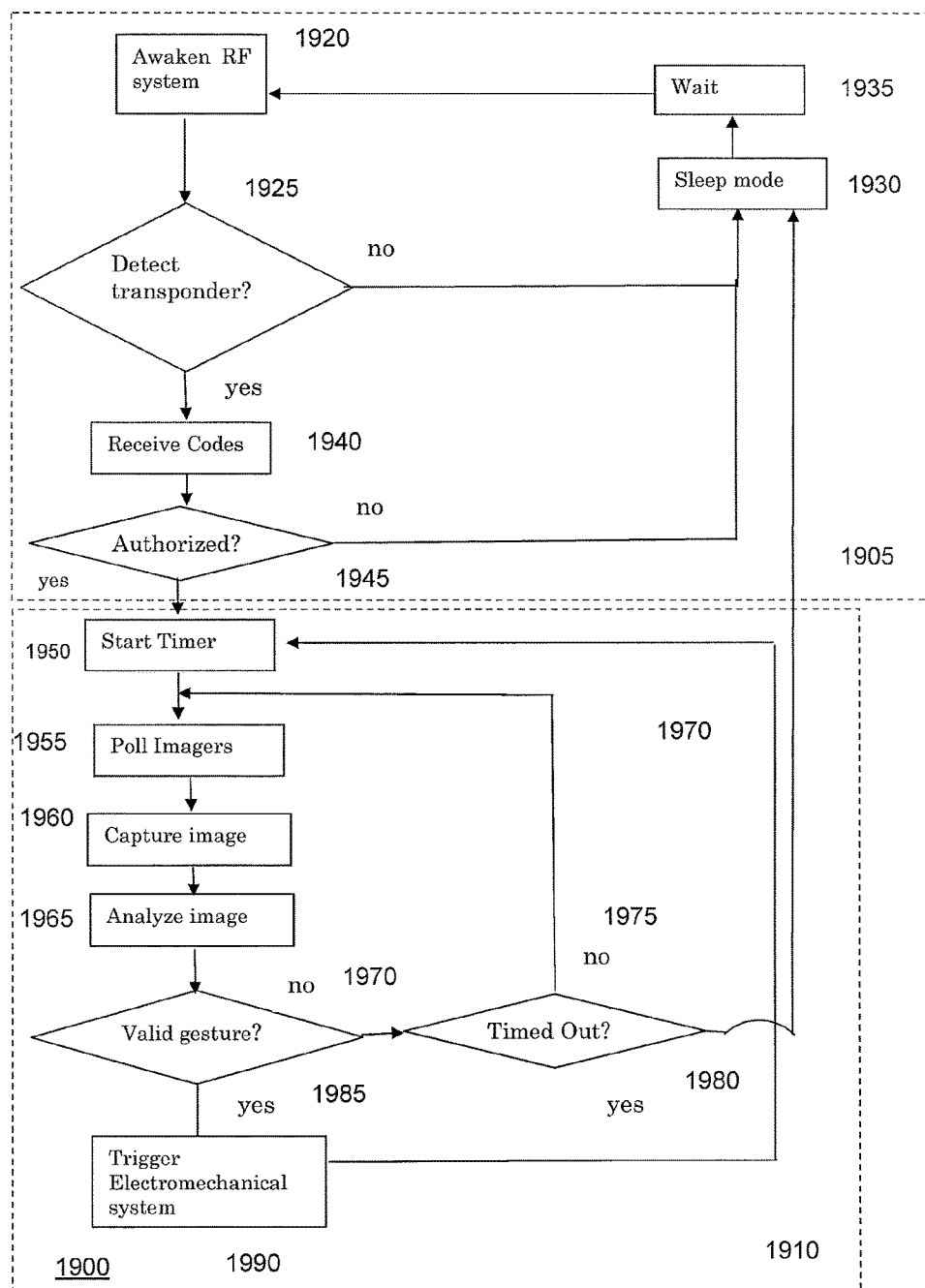
FIG. 19 is another example method for activating vehicle electromechanical systems based on image recognition and radio frequency systems.

FIG. 19 is a flow diagram 1900 of an example method of activating vehicle electromechanical systems based on image recognition and radio frequency systems. The flow diagram includes a RF detection method 1905 and an electromechanical system activation method 1910, which together enable a person to activate an electromechanical system using RF detection and gesture control. As described herein above, a RF system may be in a sleep mode and awakens based on a predetermined schedule (1920). The RF system then determines if a transponder or keyfob is detectable (1925). If the transponder or keyfob is not detected, then the RF system returns to low power mode or sleep mode (1930). The RF system then waits the predetermined time before checking again if the transponder or keyfob is detectable (1935).

If a transponder or keyfob is detected, then the RF system receives authorization, authentication or verification codes from the transponder or keyfob (1940). The codes are then checked to determine if the transponder or keyfob is associated with the vehicle (1945). If the codes are incorrect, then the RF system returns to low power mode or sleep mode (1930). If the codes are correct, then a timer is started within which images need to be captured, analyzed, and gestures validated (1950). Once the timer is started, the cameras/imagers are polled to capture an image (1955). One or more visual and/or audible indicators may notify the person that the image capture and analysis system is active. As described herein, the image capture and analysis system includes a plurality of cameras in and on the vehicle. One or more of these cameras may be polled. In an example, a camera closest to where the transponder or keyfob was detected may be polled first. The cameras capture (1960) and analyze a gesture (1965) to determine if a valid gesture has been made. If the captured image is not a valid image (1970), it is then determined if the timer is still running. If the timer is still running (1975), then the polling of the cameras continues (1955) and the process is repeated. If the timer has timed out (1980), then the system returns to sleep mode (1930).

If a valid gesture had been made (1985), then the electromechanical system is triggered (1990). The cameras may be polled again to determine if additional gestures have been made (1955). It should be understood that the process 1900 is an example and that alternative or additional steps may be performed and be within the scope of the principles of the description. For cameras inside the vehicle, the electromechanical system activation method 1910 is applied without the RF detection method 1905 as it is assumed that the cameras are awake.

As described herein, the methods described herein are not limited to any particular element(s) that perform(s) any particular function(s) and some steps of the methods presented need not necessarily occur in the order shown. For example, in some cases two or more method steps may occur in a different order or simultaneously. In addition, some steps of the described methods may be optional (even if not explicitly stated to be optional) and, therefore, may be omitted. These and other variations of the methods disclosed herein will be readily apparent, especially in view of the description of the systems described herein, and are considered to be within the full scope of the invention.

Although features and elements are described above in particular combinations, each feature or element can be used alone without the other features and elements or in various combinations with or without other features and elements.

What is claimed is:

1. A system for activating an electromechanical system in a vehicle, comprising:
    at least one radio frequency (RF) antenna that receives wireless communication signals from a transponder;
    a RF controller communicatively coupled to the at least one RF antenna;
    at least one camera attached to the vehicle that captures a gesture;
    an image processing engine communicatively coupled to the at least one camera; and
    a controller communicatively coupled to the image processing engine;
    wherein the RF controller:
    verifies that transponder is associated with the vehicle, and
    changes a power state of the imaging processing engine from a low power consumption state to a high power consumption state on a condition that the transponder is verified to be associated with the vehicle;
    wherein when in the high power state the image processing engine:
    determines that a captured gesture is a valid command; and
    wherein the controller:
    triggers a predetermined function associated with the electromechanical system on a condition that the captured gesture is a valid command, wherein the predetermined function activates the electromechanical system to open a vehicle entry point responsive to the captured gesture.

2. The system of claim 1, wherein the image processing engine is integrated with one of the at least one camera or the controller.

3. The system of claim 1, wherein the image processing engine, the RF controller and the controller are integrated.

4. The system of claim 1, wherein the RF controller is integrated with the controller.

5. The system of claim 1, wherein the command is a predetermined gesture sequence or pattern associated with the electromechanical system or the predetermined function associated with the electromechanical system.

6. The system of claim 1, wherein the at least one camera includes a camera internal to the vehicle configured to capture an internal gesture; and wherein the image processing engine determines that the captured internal gesture is a valid command.

7. A method for activating an electromechanical system in a vehicle, comprising:
determining radio frequency (RF) detection of a transponder associated with the vehicle using a RF antenna;
verifying that the transponder is associated with the vehicle using a RF controller communicatively coupled to the RF antenna;
changing, via the RF controller, a power state of at least one image sensor from a low power consumption state to a high power consumption state on a condition that the transponder is verified to be associated with the vehicle;
energizing the at least one image sensor;
capturing by the at least one image sensor a gesture on a condition that the transponder has been detected and the at least one image sensor is energized;
determining by a gesture recognition system that the captured gesture is a valid command, wherein the gesture recognition system is communicatively coupled to the at least image sensor; and
triggering, by a controller communicatively coupled to the gesture recognition system, the electromechanical system on a condition that the captured gesture is a valid command, wherein the electromechanical system opens a vehicle entry point responsive to the captured gesture.

8. The method of claim 7, wherein wireless communications signals corresponding to the transponder are received by RF antennas.

9. The method of claim 7, wherein image sensors are polled to capture gestures.

10. The method of claim 9, wherein an image sensor located nearest to an RF antenna detecting the transponder is polled first.

11. The method of claim 7, wherein the command is a predetermined gesture sequence or pattern associated with the electromechanical system.

12. The method of claim 7, wherein the captured gestures are captured by the at least one image sensor within a predetermined time.

13. The method of claim 7, wherein the captured gestures are captured by the at least one image sensor and analyzed by the gesture recognition system within a predetermined time.

14. A vehicle including electromechanical systems, comprising:
a radio frequency (RF) system;
an image recognition system communicatively coupled to the RF system; and
a controller communicatively coupled to the image recognition system;
wherein the RF system:
detects wireless communication signals from a transponder associated with the vehicle,
verifies that transponder is associated with the vehicle,
changes a power state of the image recognition system from a low power consumption state to a high power consumption state on a condition that the transponder is verified to be associated with the vehicle, and
energizes the image recognition system when the transponder is detected;
wherein the energized image recognition system:
captures images on a condition that the transponder has been detected;
determines that the captured images contain a gesture that is a valid command; and
the controller triggers the electromechanical system on a condition that the captured gesture is a valid command, wherein the electromechanical system opens a vehicle entry point responsive to the captured gesture.

15. The vehicle of claim 14, wherein the image processing system is integrated with the image capture system or the controller.

16. The vehicle of claim 14, wherein the image processing system, a part of the RF system and the controller are integrated.

17. The vehicle of claim 14, wherein part of the RF system is integrated with the controller.

18. The vehicle of claim 14, wherein the command is a predetermined gesture sequence or pattern associated with the electromechanical system.

19. The vehicle of claim 14, wherein the image recognition system includes a recognition system internal to the vehicle independent of the detection of the transponder.

* * * * *